United States Patent
Karia et al.

(10) Patent No.: US 11,983,739 B2
(45) Date of Patent: May 14, 2024

(54) MATCHING REGIONAL PROMOTIONS TO TELECOM USER PREFERENCES USING ARTIFICIAL INTELLIGENCE

(71) Applicant: INTERNATIONAL BUSINESS MACHINES CORPORATION, Armonk, NY (US)

(72) Inventors: Jignesh K. Karia, Mumbai (IN); Mukundan Sundararajan, Bangalore (IN); Pankaj Satyanarayan Dayama, Bangalore (IN); Neha Shah, Kolkata (IN); Jitan S. Chandanani, Mumbai (IN); Vishal Awal, Mumbai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/236,627

(22) Filed: Apr. 21, 2021

(65) Prior Publication Data

US 2022/0343367 A1    Oct. 27, 2022

(51) Int. Cl.
G06Q 30/0251    (2023.01)

(52) U.S. Cl.
CPC .............................. *G06Q 30/0261* (2013.01)

(58) Field of Classification Search
None
See application file for complete search history.

(56) References Cited

U.S. PATENT DOCUMENTS

| | | | |
|---|---|---|---|
| 6,509,830 B1* | 1/2003 | Elliott | H04W 64/00 340/539.2 |
| 8,254,917 B2 | 8/2012 | Ahopelto et al. | |
| 10,743,177 B2 | 8/2020 | Dimperio et al. | |
| 2009/0270068 A1* | 10/2009 | Ahopelto | H04L 67/61 455/433 |
| 2010/0287052 A1* | 11/2010 | Minter | G06Q 30/02 705/14.66 |
| 2013/0246455 A1* | 9/2013 | Otsuka | G06F 21/6227 707/769 |
| 2014/0280758 A1* | 9/2014 | Sharma | H04L 12/1475 709/219 |

(Continued)

OTHER PUBLICATIONS

Wikipedia, "Roaming", retrieved from <https://web.archive.org/web/20180612120250/https:/en.wikipedia.org/wiki/Roaming>, available on Jun. 12, 2018, referred to hereinafter as "Wikipedia" (Year: 2018).*

(Continued)

*Primary Examiner* — Sam Refai
(74) *Attorney, Agent, or Firm* — Tutunjian & Bitetto, P.C.; Michael A. Petrocelli (57) ABSTRACT

Promotional offers are presented to users by tagging users of the services with the user preferences. Promotional offers are received from vendors. The vendors are classified as being in a home area or roaming areas for the services. The users are tracked through movement of a device for the user that is receiving the services to determine whether the user is in the home area or the roaming areas. Promotional offers from the vendors are matched to the user preferences according to the tagging of the users, wherein the promotional offers are from the home area of the home network or the roaming area of the roaming network.

20 Claims, 6 Drawing Sheets

(56) References Cited

U.S. PATENT DOCUMENTS

| | | | | |
|---|---|---|---|---|
| 2014/0349610 | A1* | 11/2014 | Dimperio | G06Q 20/3224 |
| | | | | 455/411 |
| 2017/0064515 | A1* | 3/2017 | Heikkila | H04W 4/026 |
| 2017/0078861 | A1 | 3/2017 | McNamee et al. | |
| 2017/0265687 | A1* | 9/2017 | Veltrop | A47J 36/2483 |
| 2018/0108273 | A1* | 4/2018 | Nielson | A61B 5/165 |
| 2019/0005029 | A1* | 1/2019 | Mills | G06F 40/30 |
| 2019/0373420 | A1* | 12/2019 | Sivakkolundhu | H04L 67/55 |
| 2020/0007635 | A1* | 1/2020 | Vyas | H04L 67/535 |

OTHER PUBLICATIONS

Cell Phone Deals, "Cell Phone Contracts, Their Benefits And What They Include", retrieved from https://getcellphonedeals.co.za/what-they-include.php, available on Oct. 28, 2012, referred to hereinafter "Cell Phone Deals" (Year: 2012).*

H. Cell Phone Deals, "Cell Phone Contracts, Their Benefits And What They Include", retrieved from <https://getcellphonedeals.co.za/what-they-include.php>, available on Oct. 28, 2012 (Year: 2012).*

Anonymous, "How to Conduct Precision Marketing in Roaming", http://www.archclearing.com/Views/Events/13265.xhtm. Jan. 28, 2021. pp. 1-2.

Kyle Dorcas, "Quality is New Roaming Priority—The Syniverse Blog", https://www.lightreading.com/services/mobile-services/syniverse-quality-is-new-roaming-priority/a/d-id/741408. Mar. 16, 2018. pp. 1-2.

Mell et al., "The NIST Definition of Cloud Computing", National Institute of Standards and Technology, Special Publication 800-145. Sep. 2011. pp. 1-7.

\* cited by examiner

FIG. 1

```
┌─────────────────────────────────────────────────────────────────────┐
│ In response to receiving permission from a user for data collection │
│ registering users with the system for providing promotional offers, │
│         wherein revocation of permission can be                     │
│                   accomplished at any time.                         │
│                              1                                      │
└─────────────────────────────────────────────────────────────────────┘
                               │
                               ▼
┌─────────────────────────────────────────────────────────────────────┐
│  Extracting data for user preferences for promotional offers from   │
│                    document with service provider.                  │
│                              2                                      │
└─────────────────────────────────────────────────────────────────────┘
                               │
                               ▼
┌─────────────────────────────────────────────────────────────────────┐
│     Tagging users in database with preferences for promotional      │
│                              offers.                                │
│                              3                                      │
└─────────────────────────────────────────────────────────────────────┘
                               │
                               ▼
┌─────────────────────────────────────────────────────────────────────┐
│  Receiving promotional offers from vendors in home area and roaming │
│                              areas.                                 │
│                              4                                      │
└─────────────────────────────────────────────────────────────────────┘
                               │
                               ▼
┌─────────────────────────────────────────────────────────────────────┐
│ Tracking users through movement of a user device for receiving      │
│ services to determine the user is in a home area of the home network│
│                  or a roaming area of a roaming network.            │
│                              5                                      │
└─────────────────────────────────────────────────────────────────────┘
                               │
                               ▼
┌─────────────────────────────────────────────────────────────────────┐
│  Matching promotional offers from vendors to users based upon the   │
│  user preferences, wherein the promotional offers are from the home │
│  area or roaming area that the user is present in based upon their  │
│                        service device location.                     │
│                              6                                      │
└─────────────────────────────────────────────────────────────────────┘
                               │
                               ▼
┌─────────────────────────────────────────────────────────────────────┐
│   Sending matched promotional offers to the user preferences to the │
│             service receiving device of the user for the service.   │
│                              7                                      │
└─────────────────────────────────────────────────────────────────────┘
                               │
                               ▼
┌─────────────────────────────────────────────────────────────────────┐
│  Displaying the matched promotional offers on the interface of the  │
│  service receiving device for the user of the service when the user │
│  is the service area matching the location of the vendor offering   │
│                      the promotional service.                       │
│                              8                                      │
└─────────────────────────────────────────────────────────────────────┘
                               │
                               ▼
                           ( END )
```

MATCHING REGIONAL PROMOTIONS TO TELECOM USER PREFERENCES USING ARTIFICIAL INTELLIGENCE

BACKGROUND

The present invention generally relates to promotional messages, and more particularly to sending promotional messages to telecom users.

Location-based advertisements and targeted messages constitute an important aspect of modern telecommunications. In some examples, advertising entities access a mobile user's GPS coordinates to push targeted advertisements corresponding to the user's current location. For example, when the user is in a particular city, various apps installed on a user's smartphone will push advertisements for restaurants or hotels in that geographic area.

SUMMARY

In accordance with an embodiment of the present invention, a computer-implemented method for presenting regional based promotional offers to roaming/transient subscribers is described that includes extracting data for user preferences from a contract for services; and tagging users of the services with the user preferences. The method also includes receiving the promotional offers from vendors; and classifying the vendors as being in a home area or roaming areas for the services. Additionally, the method may include the steps of tracking the users through movement of a device for the user that is receiving the services to determine whether the user is in the home area or the roaming areas. Further, the method can match the promotional offers from the vendors to the user preferences according to the tagging of the users. The promotional offers are from the home area of the home network or the roaming area of the roaming network. The method may further include sending matched promotional offers to the users according to the tagging concurrently with the users entering a home area or roaming area. The roaming matched promotional offers that are specific to the roaming area are sent to the user when using the roaming network. The home matched promotional offers that are specific to the home area are sent to the user when the user is using the home network.

In another embodiment, a system for presenting regional based promotional offers is provided that includes a hardware processor; and a memory that stores a computer program product. The computer program product when executed by the hardware processor, causes the hardware processor to record user preferences from a contract for services, and tag users of the services with the user preferences. The computer program product can also receive promotional offers from vendors; and classify the vendors as being in a home area or roaming areas for the services. The computer program product may also track the users through movement of a device for the user that is receiving the services to determine whether the user is in the home area or the roaming areas. Further, in some embodiments, the computer program product can also match the promotional offers from the vendors to the user preferences according to the tagging of the users, wherein the promotional offers are from the home area of the home network or the roaming area of the roaming network. In some embodiments, the computer program product can also send matched promotional offers to the users according to the tagging concurrently with the users entering a home area or roaming area. The roaming matched promotional offers specific to the roaming area are sent to the user when using the roaming network. The home matched promotional offers specific to the home area are sent to the user when using the home network/roaming network based on a user's preference.

In yet another embodiment, a computer program product is described for presenting regional based promotional offers. In one embodiment, the computer program product includes a computer readable storage medium having computer readable program code embodied therewith, the program instructions executable by a processor to cause the processor to record, using the processor, user preferences from a contract for services. The computer readable program code can also tag, using the processor, users of the services with the user preferences. In some embodiments, the computer readable program code also receives, using the processor, promotional offers from vendors; and classifies, using the processor, the vendors as being in a home area or roaming areas for the services. The computer readable program code can also include instructions to track, using the processor, the users through movement of a device for the user that is receiving the services to determine whether the user is in the home area or the roaming areas. In some instances, the computer readable program code may match, using the processor, the promotional offers from the vendors to the user preferences according to the tagging of the users, wherein the promotional offers are from the home area of the home network or the roaming area of the roaming network; and send the matched promotional offers to the users according to the tagging concurrently with the users entering a home area or roaming area. The roaming matched promotional offers that are specific to the roaming area are sent to the user when using the roaming network. The home matched promotional offers specific to the home area are sent to the user when using the home network/roaming network based on a user's preference.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

In some embodiments, the methods, systems and computer program products can determine user preferences and consent for promotional messages. A "promotional message" may be any offer to the user for a goods or service. For example, the promotional message may be an offer for food purchase, dining services, hotel stays, consumer good purchases, etc. In some embodiments, the methods, systems and computer program products described herein are suitable for use with telecom applications, in which user preferences are extracted from telecom contracts, e.g., using natural language processing. However, this is only one example of an application for methods, systems and computer program products, and the present disclosure is not limited to only this example. Other suitable applications for providing promotional messages can include any system that has users traveling between different service areas, which can include navigation system services, such as Global Positioning System (GPS) navigation, among others.

In some examples, an organization that wishes to send promotional messages to telecom users will follow certain rules and guidelines, and generally have appropriate authority from the user to send promotional messages. In these examples, the authority for the organization to send promotional messages applies a user preference set by the user for the telecom subscription. As used herein, "telecom" denotes a telecommunications provider. Telecommunications companies include companies that transmit data in words, voice, audio, or video across the globe. Telecom equipment, telecom services, and wireless communication are the three basic elements of telecommunications, and a telecom company typically provides at least one of the above elements.

Under the aforementioned circumstances the user having the telecom subscription provides the approval to the organization sending the promotional messages to send messages to the user. In some instances, the user preferences, or choice to receive promotional messages is limited to the direct service boundary for the services provided by the telecom company. In some examples, this can provide a disadvantage, because a user may still want to receive promotional messages when the user has exceeded the direct service boundary, e.g., when the user is in roaming from the home network.

"Roaming" enables a mobile subscriber to automatically make and receive voice calls, send and receive data, or access other services when travelling outside the geographical coverage area of their home network, by means of using a visited network. In more technical terms, roaming refers to the ability for a cellular customer to automatically make and receive voice calls, send and receive data, or access other services, including home data services, when travelling outside the geographical coverage area of the home network, by means of using a visited network. For example: should a subscriber travel beyond their cell phone company's transmitter range, their cell phone would automatically hop onto another phone company's service, if available.

In some embodiments, the roaming process is supported by the telecommunication processes of mobility management, authentication, authorization, and accounting billing procedures (known as AAA or 'triple A'). Roaming can be divided into "SIM-based roaming" and "username/password-based roaming", whereby the technical term "roaming" also encompasses roaming between networks of different network standards, e.g. WLAN (Wireless Local Area Network) or GSM (Global System for Mobile Communications). Device equipment and functionality, such as SIM card capability, antenna and network interfaces, and power management, determine the access possibilities. For the purposes of roaming there are home and visited networks. "Home network" refers to the network the subscriber is registered with. "Visitor network" refers to the network a subscriber roams temporarily and is outside the bounds of the "home network".

As noted, the user preferences or choices to receive promotional messages limited by the boundaries of the home network are not advantageous to telecom subscribers when they travel to locations in which roaming services are needed to maintain communications. For example, a user making use of telecom services and going beyond the direct service boundaries, e.g., while roaming, may like to set multiple preferences to receive local promotional messages within the roaming territories, e.g., like for promotional messages for food, hotel, shopping areas, etc. If the user preference can be applied beyond the boundaries of the home network, it would be helpful to the user, and also provide more revenue generating option for the telecom service provider. The method, systems and computer program products of the present disclosure are now described in greater detail with reference to FIGS. 1-6.

Figure 1:
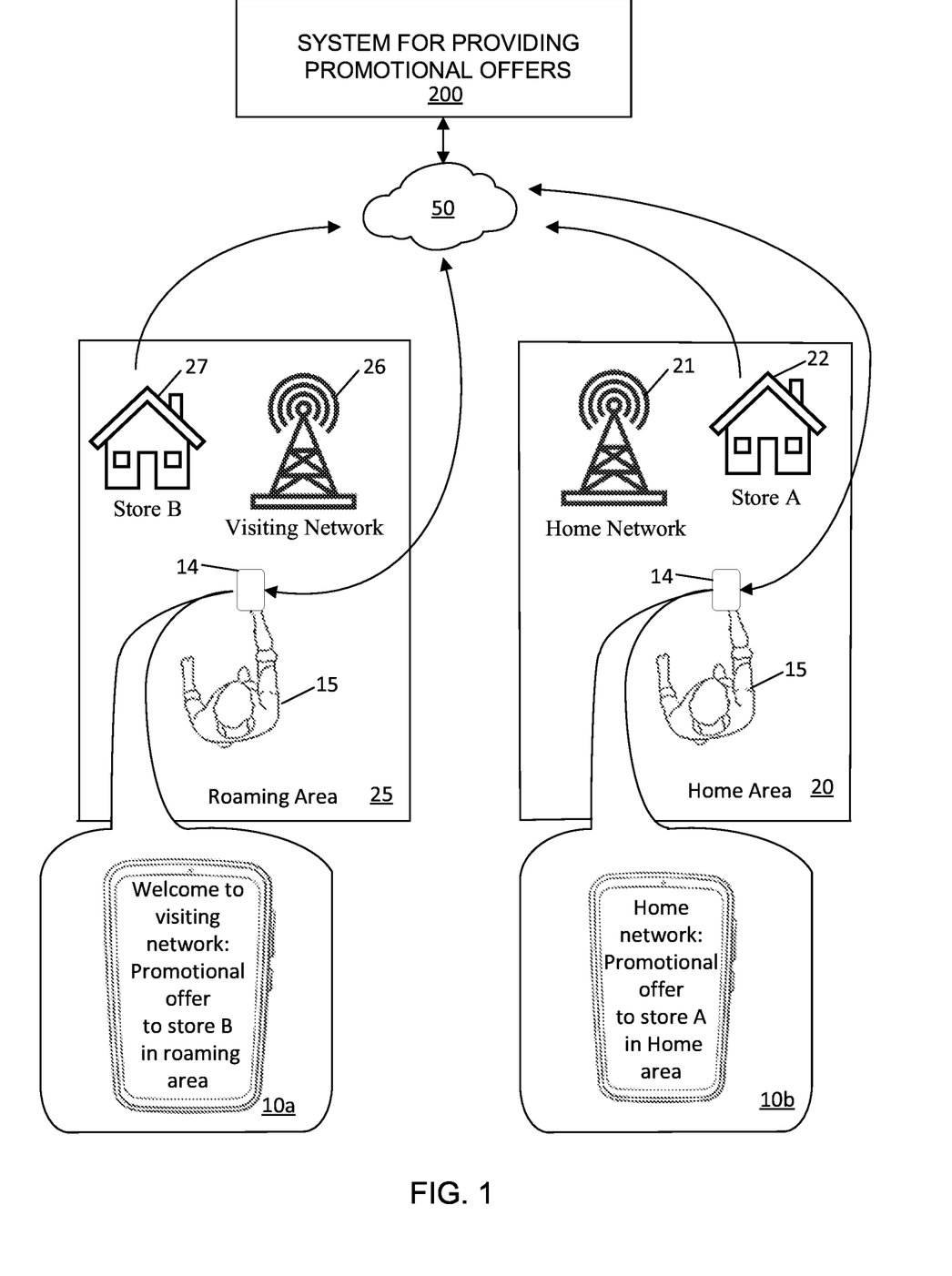
FIG. 1 is a diagram illustrating an exemplary environment, where a system provides for sending promotional messages to a user of telecom services when the user is in both the home network and when the user is roaming via a visitor network, in accordance with one embodiment of the present disclosure.
Figure 2:
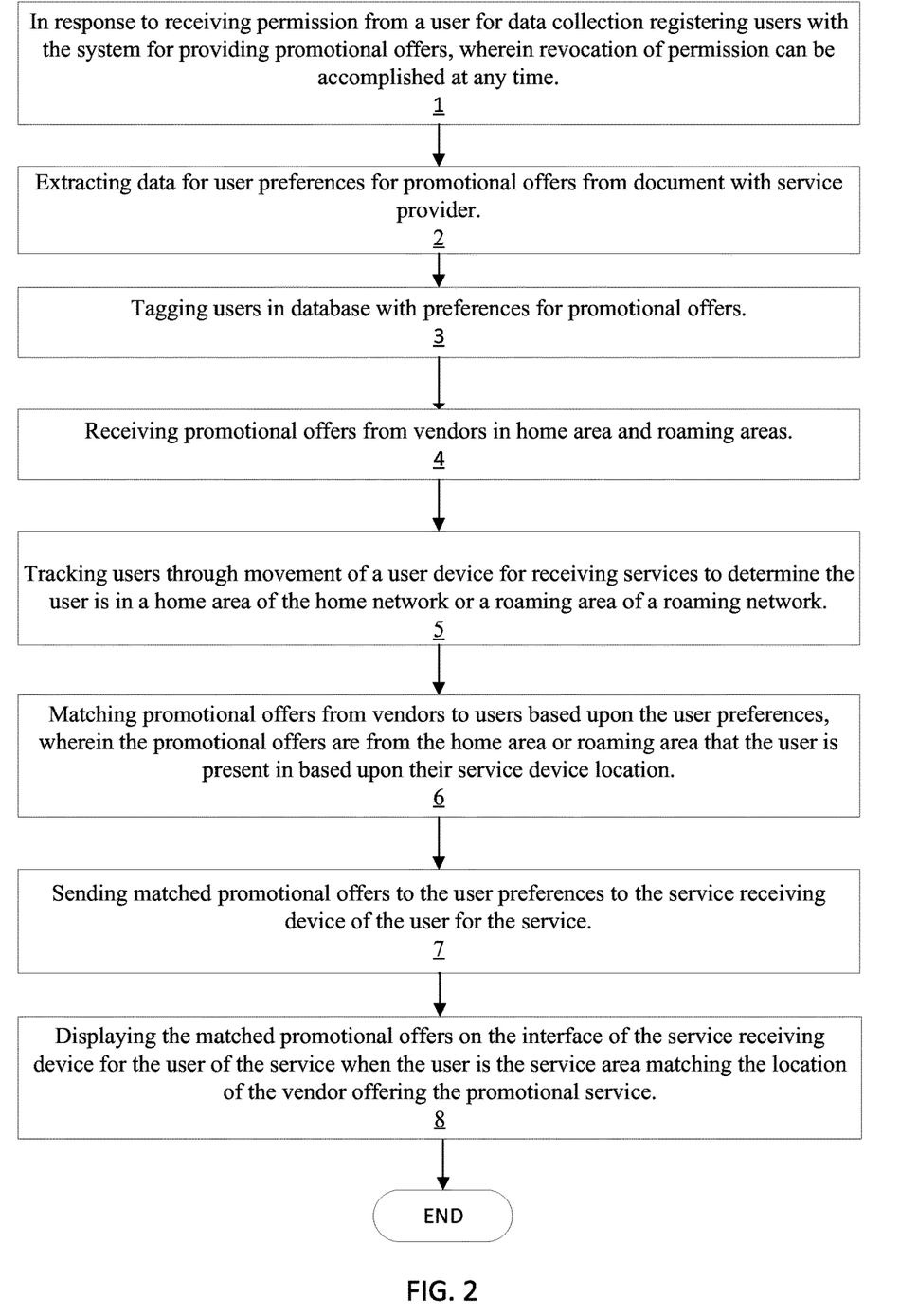
FIG. 2 illustrates a method for issuing promotional offers to a telecom user, in which the promotional offers are matched to the telecom user preferences, and the promotional offers are provided to the telecom user when the user is in the service region that is proximate to the vendor that is offering the matched promotion, in accordance with one embodiment of the present disclosure.
Figure 3:
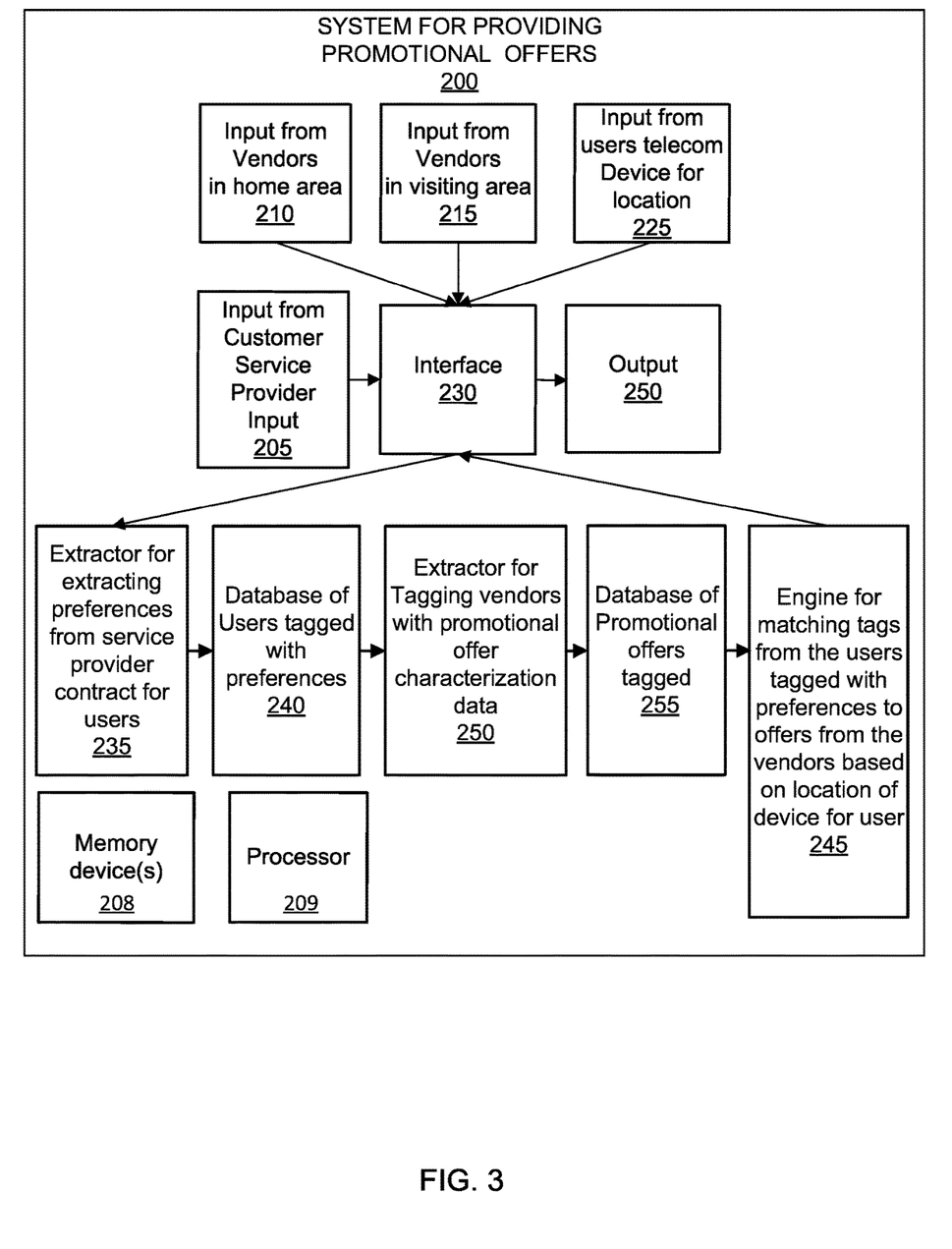
FIG. 3 illustrates a system for issuing promotional offers to a telecom user, in which the promotional offers are matched to the telecom user preferences, and the promotional offers are provided to the telecom user when the user is in the service region that is proximate to the vendor that is offering the matched promotion, in accordance with one embodiment of the present disclosure.

FIG. 1 is a diagram illustrating an exemplary environment, where a system provides for sending promotional messages to a user of telecom services when the user is in both the home network and when the user is roaming via a visitor network. FIG. 2 illustrates a method for issuing promotional offers to a telecom user, in which the promotional offers are matched to the telecom user preferences, and the promotional offers are provided to the telecom user when the user is in the service region that is proximate to the vendor that is offering the matched promotion. FIG. 3 illustrates a system issuing promotional offers consistent with the methods described with reference to FIG. 2.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

FIG. 1 is a diagram illustrating an exemplary environment, where a system 200 provides for sending promotional messages 10a, 10b to a user 15 of telecom services when the user is in either of a home area 20 corresponding to a home network 21, and when the user 15 is roaming via a visitor network 26 of a visiting area 25. The system 200 provides for sending promotional messages can be in communication with at least one of the users 14, the telecom service providers, and the vendors 22, 27 that offer promotional offers through a network 50 that can be provided through the internet. In some embodiments, the service providers and the users 15 may be in communication though the cellular networks 21, 26 that the telecom service providers manage, and which the users 15 may have contracted for through the service providers.

In some embodiments, the user preference or choice to receive promotional messages 10a, 10b is not limited to only direct service boundary of their home area 20 being serviced by the home network 26. In some embodiments, a user 15 making use of the telecom services while going beyond the direct service boundaries of the home network 26, and while roaming in a visiting area 25 serviced via a visiting network 26, the user 15 can have multiple preferences to receive local promotional messages 10b in the roaming areas, e.g., visiting areas 25, such as promotional offers 10 b for food, hotel, shopping areas, and so on. The promotional offers 10a can be for services and goods provided by product provides having locations in either of the roaming area 25, e.g., store B 27, or the home area 20, e.g., store A 22. As will be described in further detail below, the setting of the user preferences can be selected by the user 15 when the user 15 is entering into a service contact with a telecom service provider.

The telecom service provider that the user 15 contracts with manages the home network 21, which provides telecommunications services to the home area 20. The telecom service provider that contracts with the user 15 and manages the home network may be referred to as the "home telecom service provider". The home telecom service provider also has contracts, agreements and connections with the operators of telecom service networks outside the home area 20. Providers of telecom services outside of the home area 20 (and not services by the home network 21) may be referred to as "visiting telecom service providers". The visiting telecom service providers manage the visiting network 26 which provides telecom services, e.g., roaming services, to the roaming area 25.

The contracts, connections, agreements between the home telecom service provider and the visiting telecom service provider can be the basis upon which a user 15 having a contract for services with the home telecom service can receive telecom services, e.g., via roaming services, outside the home area 20, e.g., when present in visiting areas, e.g., roaming areas 25, being serviced by the vising network 26. Although, the user 15 has no contract, or other agreement, with the visiting telecom service providers, the preferences the user 15 has designated with the home telecom service can be extended to the roaming areas 25 by the system 200 for sending promotional messages. In this manner, the user 15 can receive promotional messages 10a, 10b on their telecom device 14 that are consistent with their preferences when the user 15 is receiving roaming cellular service in the roaming area 25 being serviced by the roaming network 26.

The type of promotional messages 10a that the user 15 has designated for receiving in the home area 20 are extended to the roaming area 25 by the system 200 for sending promotional offers.

For example, for a user 15 having a service plan with the home telecom service provider operating the home network 21, the user 15 can can set preferences which defines categories the user would like to receive promotional messages 10a in the home area 20. The categories can be any type of service or goods, e.g., food, entertainment, banking, insurance, etc. In some embodiments, as the user 15 goes beyond the direct service area, e.g., home area 20, of the home service provider, the system 200 for sending promotional messages can extend to the user 15 the ability receive like promotional messages for the same categories for a user's period of stay offsite from the home area 20, e.g., by receiving promotional messages 10b while roaming in the roaming area 25 and receiving telecommunications services from the visiting network 26.

In another example, the user 15 when within the service boundaries, e.g., home area 20, receiving cellular service from the home network 21 of the home telecom service provider, may have preferences to receive promotional message from the specified entity, e.g., a specific company or brand. In some embodiments, as the user 15 goes beyond the direct service area, e.g., home area 20, of the home service provider, the system 200 for sending promotional messages can extend to the user 15 the ability to receive like promotional messages for the same brand and entities for a user's period of stay offsite from the home area 20, e.g., by receiving promotional messages 10b while roaming in the roaming area 25 and receiving telecommunications services from the visiting network 26.

In yet another example, for a user 15 having a service plan with the home telecom service provider operating the home network 21, the user 15 can set preferences for which defined categories the user would like to receive promotional messages 10a in the home area 20. The categories can be any type of service or goods, e.g., food, entertainment, banking, insurance, etc. In some embodiments, as the user 15 goes beyond the direct service area, e.g., home area 20, of the home service provider, the system 200 for sending promotional messages can extend to the user 15 the ability receive like promotional messages for the similar categories for a user's period of stay offsite from the home area 20, e.g., by receiving promotional messages 10b while roaming in the roaming area 25 and receiving telecommunications services from the visiting network 26. In this example, even though the roaming area 25 does not have promotional offers for venders, e.g., store B 27, having the same categories as the promotional offers the user 15 was receiving in their home area 20, the system 200 for sending promotional messages will find categories that are similar to the user's preference.

In yet a further example, the user 15 when within the service boundaries, e.g., home area 20, receiving cellular service from the home network 21 of the home telecom service provider, may have preferences to receive promotional message from a specified entity, e.g., a specific company or brand. In some embodiments, as the user 15 goes beyond the direct service area, e.g., home area 20, of the home service provider, the system 200 for sending promotional messages can extend to the user 15 the ability receive like promotional messages for a similar brand or entities for a user's period of stay offsite from the home area 20, e.g., by receiving promotional messages 10b while roaming in the roaming area 25 and receiving telecommunications services from the visiting network 26. In this example, even though the roaming area 25 does not have promotional offers from the same brand or entity as the promotional offers the user 15 was receiving in their home area 20, the system 200 for sending promotional messages will find brands and/or entities that are similar to the user's preference.

Extending the user preference beyond the boundaries of the home area 20 can be helpful to the user 15, and can also provide more revenue generating options for the home telecom service provider.

FIG. 2 illustrates a method for issuing promotional offers 10a, 10b to a telecom user 15, in which the promotional offers 10a, 10b are matched to the telecom user preferences, and the promotional offers 10a, 10b are provided to the telecom user 15 when the user is in the service region that is proximate to the vendor 22, 27 that is offering the matched promotion. In some embodiments, the method may begin with registering the users 15 at block 1. Block 1 includes that in response to receiving permission from a user for data collection, the users are registered with the system 200 for providing promotional offers, wherein revocation of permission can be accomplished at any time.

The telecom users 15 are providing promotional offer preferences to the home telecom service provider for the home area 20. For example, whenever the telecom user 15 signs the roaming contract, he can be presented with multiple options for promotional offer preferences. The telecom user 15 can contract to the telecom service provider to extend category preference data, e.g., the type of services consumer/goods in the promotional offer, such as restaurant or banking services, to the roaming location 25. In another example, the telecom user 15 can contract to the telecom service provider to extend entity preference data, e.g., what company or brand is offering the promotional offer, to same entity in roaming location 25. In yet another example, the telecom user 15 can contract to the telecom service provider to extend entity preference data to similar entities in roaming location 25. In an even further example, the telecom user 15 can contract to the telecom service provider to recommend new entities based on the existing entity preference data Further, the system for providing promotional offers also includes elements that can track when the telecom device is in a home area 20 or a roaming area 25. The telecom user 15 has the option of allowing the system 200 to access this information, and the telecom user 15 can rescind that authorization to access or use the user's promotional preference information at any time.

To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In some embodiments, when a telecom user 15 registers with the system 200 for providing promotional offers, the telecom user 15 is provided a profile (user profile) that is stored in the system 200.

Referring to block 2 of FIG. 2, the method may further include recording user preferences for promotional offers from contract with the telecom provider, e.g., home telecom service provider. Recording the user preferences can be achieved by the user entering the preferences into an interface of the system 200 for providing promotional offers. In some embodiments, the preferences for promotional offers that are selected by the user 15 are recorded during the stage at which the user enters a contract for telecom services with the home telecom service provider. The preferences for promotional offers can include preferences for services, preferences for goods, etc. For example, the users 15 may designate during signing up for promotional offers 10a, 10b for restaurants, promotional offers for products for sale, promotional offers 10a, 10b for financial lending, promotional offers for credit card companies, etc. In other examples, the users 15 may designate a specific entity for offering a promotional offer. The specific entity may be a company name for a service or goods provider 22, 27, or the specific entity may be a brand.

In some embodiments, the designation of preferences for promotional offers by the user 15 is not necessarily limited to the contract for cellular service with home network service provider that provides the home network 21 in the home area 20. In some embodiments, the designation of preferences for promotional offers by the user 15 may be recorded at the time the user 15 contracts for roaming services, i.e., cellular service outside the home area 20.

FIG. 3 illustrates a system 200 for issuing promotional offers to a telecom user, in which the promotional offers are matched to the telecom user preferences, and the promotional offers are provided to the telecom user when the user is in the service region that is proximate to the vendor that is offering the matched promotion. Block 2 of the method illustrated in FIG. 2 for recording the user preferences for promotional offers may provide one input to the system 200 for providing promotional offers. More specifically, the input from the telecom service provider identified by block 205 of FIG. 3 can provide the block 2 for the method. The input from the telecom service provider, e.g., home telecom service provider, may be through any interface, such as an interface receiving data via a data input mechanism, such as a keyboard, touch screen etc. The input from the telecom service provider input 205 may be one input to the interface 230 of the system for providing promotional offers 200. Other inputs to the system for providing promotional offers 200 that may be received at the interface 230 can include an input from vendors in the home area 210, an input from vendors in a visiting area 215, and an input from a user's telecom device for location 225.

In some embodiments, in which the user preferences are designated in a service contract, the step of recording user preferences for promotional offers from the contract with the home telecom service provider at block 2 of the method depicted in FIG. 2 may further include extracting the user preferences from the service contract using natural language processing (NLP). Natural language processing (NLP) is a subfield of computer science, information engineering, and artificial intelligence concerned with the interactions between computers and human (natural) languages, in particular how to program computers to process and analyze large amounts of natural language data. Natural language processing frequently involves, natural language understanding, and natural language generation.

Referring to FIG. 3, the step of extracting the user preferences from the input data, e.g., service contract, that is entered into the system may be provided by an extractor 235 for extracting preferences from service provider contract users of the system 200 for providing promotional offers. The extractor 235 may include at least one hardware processor and hardware memory. The memory may include program code providing for natural language processing (NLP), which can detect and extract user preferences for promotions from the service provider contract. Natural Language Processing (NLP) is a branch of Artificial Intelligence (AI) in which the goal is to provide systems that can make sense of text and perform tasks like translation and/or topic classification. The extractor can classify text from the service contract into the different user preferences directed to what types of promotional offers the user's would prefer to receive.

In some embodiments, following recording the user preferences for promotional offers at block 2, the method may continue at block 3 of the method illustrated in FIG. 2 with tagging users in a database with preferences for promotional offers. The identities for the users 15 are stored in user profiles in a database in the system 200. In some examples, the identities of the users 15 can be in a distributed blockchain ledger or database. In some embodiments, tagging the telecom users with the user preferences includes including preference content in the metadata of stored telecom user profiles in the database. Referring to FIG. 3, the system 200 for providing promotions may include a database of users tagged with preferences 240. In some examples, the data for the users tagged with preferences 240 can be stored in a distributed blockchain ledger or database. The database of users tagged with preferences 240 may provide the storage for the stored telecom user profiles including the metadata illustrating the preferences for the promotional offers that the users wish to received.

In addition to associating preferences for promotional offers to the user's 15 of telecom services, the method for providing promotional offers further receives promotional offers from vendors 22, 27 in the home area 20 and the roaming area 25. The method depicted in FIG. 2 includes receiving promotional offers from vendors in the home area and the roaming areas at block 4. Referring to FIG. 3, the system 200 for providing promotional offers includes inputs for receiving promotional offers from vendors 22, 27 in the home area 20 and the roaming area 25 for matching to the telecom user preferences. Referring to FIG. 3, in one embodiment, one of the inputs to the interface 230 of the system 200 is the input from vendors 22 in the home area 210. The interface 230 of the system 200 for providing promotional offers also includes an input from vendors 27 in the roaming area 25.

Referring to FIG. 2, the method of providing promotional offers matches the offers from the vendors 22, 27 to the telecom users 15 in accordance with the telecom users preferences, and the location of the telecom users, e.g., whether the telecom user 15 is present in a home area 20 receiving cellular service from a home network 21, or whether the telecom user 15 is present in a roaming area 25 receiving cellular service from a visiting network 26. The user preferences are determined in accordance with blocks 2 and 3 of the method depicted in FIG. 2. The promotional offers are provided at block 4.

Block 5 of the method depicted in FIG. 2 includes tracking the telecom users through movement of their telecom device 14 to determine whether the user 15 is in a home area 20 or roaming area 25. The telecom device 14 can be a machine for telecommunications including a hardware processor that can be a hand held device. One example of a telecom device 14 that is suitable for use with the methods, systems and computer program products that are described herein includes a phone having a having at least one radio antenna in order to transmit or receive radio signals for cellular service with the home network 21 and the visiting network 26. In addition to cellular access, the smart phones can also have internet access 50. Another example of a telecom device 14 that is suitable for use with the methods, systems and computer program products described herein can be a tablet computer. In some embodiments, the tracking of the users 15 through movement of the telecom device 14 for the user that is receiving the telecom services to determine whether the user is in the home area or the roaming areas comprises a measurement of whether a cellular connection of the telecom device 14 is to the home network 21 or the visiting network 26. The tracking location, e.g., whether the user 15 is present in a home network 21 or visiting network 26, is an input to the system 200 for providing promotional offers depicted in FIG. 3. The input from the users telecom device for location 225 is an input into the interface. As noted, the location of the users 15 input into the system 200, in addition to the extracted preferences tagged to the user profile is used for data in matching the promotional offers 10a, 10b to the users 14 according to their preferences and locations.

Block 6 of the method depicted in FIG. 2 includes matching promotional offers 10a, 10b from vendors 22, 27 to telecom users 15 based on their user preferences. The matched promotional offers 10a, 10b are from vendors 22, 27 in the location that the user 15 is present in based on the location of their telecom device 14. For example, when the telecom user 15 is using roaming telecom services, e.g., receiving cellular service from the visiting network, the preferred promotional offers 10b are sent to the user 15 for vendors 27 in the roaming area 25. Further, when the telecom user 15 is using telecom services, e.g., receiving cellular service from the visiting network, the preferred promotional offers 10b are sent to the user 15 for vendors 27 in the roaming area 25.

For example, when the telecom user 15 enters into a telecom service contract, e.g., including a roaming contract, with a home telecom service provider, the telecom user 15 may be presented with multiple options for which the telecom user 15 contracts for promotional offers to be extended into a roaming area 15. The following options can be available to the telecom user 14:
a) extending category preference data to the roaming location;
b) extending entity preference data to same entity in roaming location;
c) extending entity preference data to similar entities in roaming location; and
d) recommending new entities based on the existing entity preference data.

In some embodiments, based on the option selected by the telecom user 15, the system 200 updates the overall user consent on the ledger in such a way that user utility in cloud computing (UCC) is reduced and entities in roaming location can subscribe to the system as it provides the required transparency. Utility in cloud computers is the computer resources, e.g., the amount of hardware processing, that is provided to the telecom user based on demand. Reducing the UCC, reduces the computer resources, e.g., reduces the hardware processing load of the cloud computing environment, which in turn increases the application speed for providing the promotional offers 10a, 10b.

Figure 4:
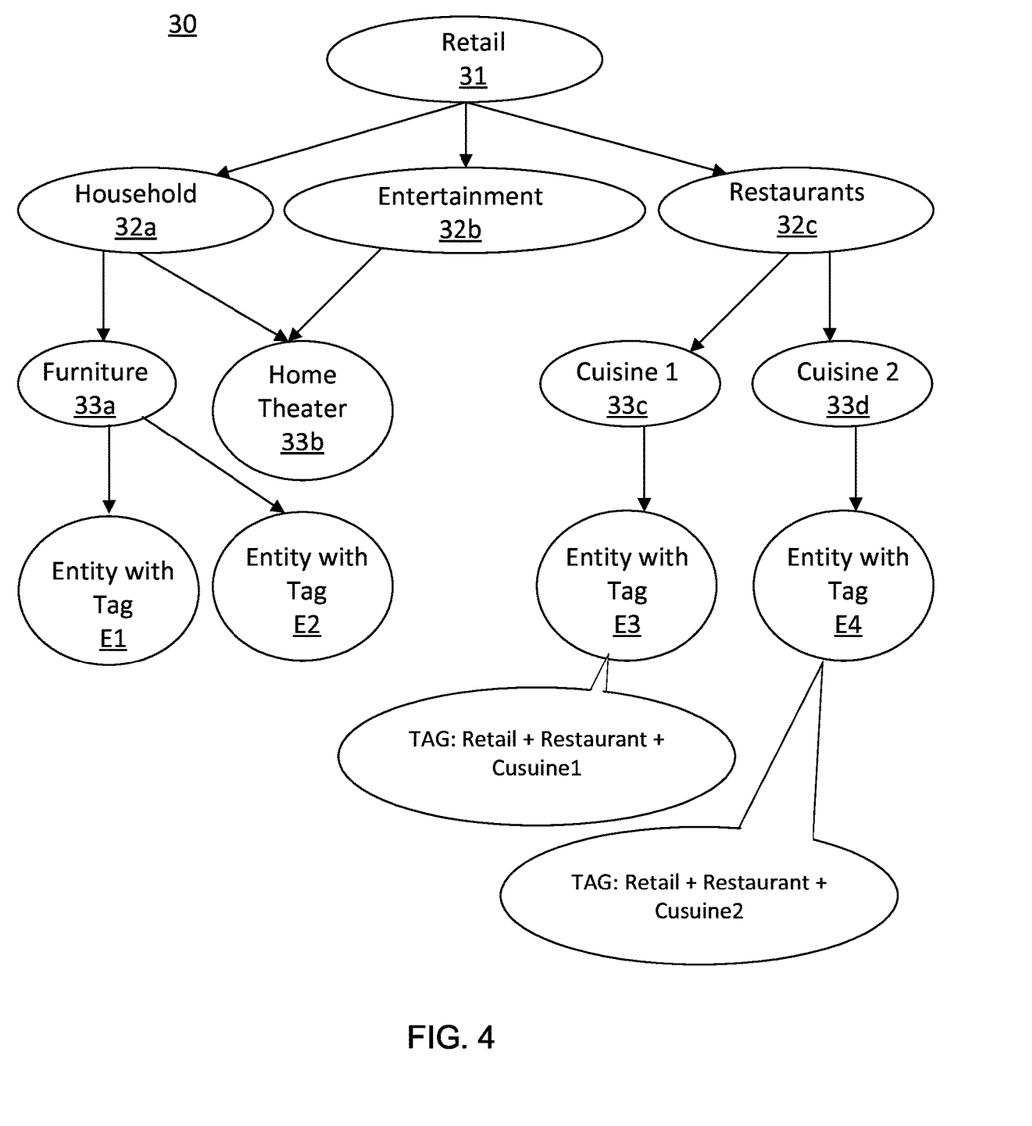
FIG. 4 illustrates one embodiment of a hierarchical tree, in which standardized characterization of entities is captured on the ledger, in accordance with one embodiment of the present disclosure.

In the embodiments, in which a similar entity is extended to the telecom user 15 in the roaming area 25 from their preferences for promotional offers, the system 100 may perform an analysis that considers inputs that can include at least one the contract signed by the telecom user 15, customer consent data for entities, and new entities in roaming location with metadata illustrating their entity and/ or type of consumer goods/services provided. The analysis provided by the system can provide an output with an automated addition of new entities within the roaming area 25 to the user consent set for preferences for promotional offers. The analysis can include a hierarchical tree 30, in which standardized characterization of entities is captured on the ledger, as depicted in FIG. 4. The system 200 for providing promotional offers includes an interface 230 that includes inputs 210, 215 from both vendors 22 in the home area 20 and vendors 27 in the roaming area 25. The vendors 22, 27 are considered entities. The example depicted in FIG. 4 includes four entities, i.e., E1, E2, E3 and E4. The system 200 processes each promotional offer, so that Each entity includes a tag. A tag is generated for each entity based on this hierarchical tree. For example, a tag may include a characteristic type of good or service, e.g., the classification could be retail 31, as opposed to a service. Within retail could be different industry types 32a, 32b, 32c, such as household goods 32a, entertainment goods 32b, and restaurant food products 32c. A further level of classification may be the type of products sold within the industry type. For example, a next level of characterization can be furniture products 33a and home theater products 33b for household goods, and different types of cuisine, e.g., cuisine 1 33c or cuisine 2 33d, for restaurants 32c. It is further noted, that there can be overlap of products with industry types. For example, promotional offers for home theater goods 33b can be characterized in industry types for both household goods 32a and entertainment goods 32b.

From the above characterizations, e.g., goods or services 31, industry type 32a, 32b, 32c, and/or product type 33a, 33b, 33c, 33d, of each entity E1, E2, E3, E4, a tag may be assigned to the entity. For example, a tag for a first entity E3, e.g., vendor 22 within the home area 20, may be "Retail+Restaurant+Cuisine 1". For example, a tag for a second entity E4, e.g., vendor 22 within the home area 20, may be "Retail+Restaurant+Cuisine 1".

The tags associated with each of the promotional offers 10a, 10b, for each of the entities, e.g., vendors 22, 27, are used by the system to match the preferences of the user 15. As noted above, the system 200 includes a database of uses tagged with references 240. For example, in some instances, the user consent profile for telecom users 15 in the database 240 is essentially a set of tags that he has provided approval for.

Tagging the entities E1, E2, E3, E4 (that in some instances correspond to vendors 22, 27) to include characterizing details regarding the promotional offers 10a, 10b, can be provided the system 200 that includes an extractor 250 for tagging vendors with promotional offer characterization data, as depicted in FIG. 3. Examples of tags with promotional offer characterization data is provided by the hierarchical tree that is depicted in FIG. 4. The step of extracting the offer characterization data is provided by the extractor 250 that may include at least one hardware processor and hardware memory. The memory may include program code providing for natural language processing (NLP), which can detect and extract user promotional offer characterization data from promotions received from the vendors 22, 27 through the input 210 from vendors 22 in the home area 20, and the input 215 from venders 27 in the roaming area 25.

Referring to FIG. 3, in some embodiments, the system may include a database 250 of promotional offers that have been tagged. This is a form of memory that stores the information for all of the entities E1, E2, E3, E4 (such as vendors 22, 27) that have been tagged with promotional offer data characterization.

In a following step, once the preferences for the telecom users 15 has been recorded and tagged to the profiles of the telecom user, and the promotional offers for the entities E1, E2, E3, E4 (such as vendors 22, 27) have been characterized and tagged, the system 200 for providing promotional offers can then match entities with promotional offers to the preferences of the telecom user 15 when the telecom user 15 is present in the home area and the roaming area 25.

Referring to FIG. 3, in some embodiments, to provide the matching function to match promotions to telecom users, the system 200 for providing promotional offers 200 may include an engine 245 (also referred to a matching engine 245) for matching preferences tags from the telecom user profiles to promotional characterization tags for the entities, e.g., vendors 22, 27. The matching engine 245 may be provided by some form or artificial intelligence providing device to determine matches. In some embodiments, the matching engine 245 may include neural networks, expert systems, genetic algorithms, intelligent agents, logic programming, and fuzzy logic. Neural network artificial intelligence is based loosely upon the cellular structure of the human brain. Cells, or storage locations, and connections between the locations are established in the computer. As in the human brain, connections among the cells are strengthened or weakened based upon their ability to yield "productive" results. The system uses an algorithm to "learn" from experience. Neural nets are an inductive reasoning method. Expert systems are usually built using large sets of "rules." Genetic algorithms utilize fitness functions, which are relationships among criteria, to grade matches.

In one example, the matching engine 245 is an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process. The matching engine 245 may include at least one hardware process and memory, in which the memory may include instructions for providing artificial intelligence in the form of the ANN, in which the instructions for matching are stored on the memory and cause the hardware processor to provide the matching process steps.

For example, the matching process steps can include the system 200 identifying if the exact entities, e.g., promotional offer from vender 27, for which consent is provided by the telecom user 15 exists in the roaming location 25. If yes, then the promotional offer from the entity, e.g., vendor 27 in the roaming area 25, is added to the user consent set for promotional offers to be forwarded to the telecom user through their telecom services.

If exact entity doesn't exist for a promotional offer that matches the preferences of a telecom user 15 in the roaming area 25, i.e., for each tag in the user profile, the system 200 for providing promotional offers identifies entities (e.g., vendors 27) in the roaming location 25 with similar tags (appropriate similarity metric) and add it to user consent set for promotional offers, which can be forwarded to the users, e.g., through their contracted cellular service. In some instances, the inputs to the system for providing similar tags can include the contract signed by the customer, customer consent data for entities, entities metadata, new entities in roaming location with metadata, etc. The output from the system 200 can be a recommendation for a subset of entities to an agent that forwards promotional offers to the telecom user 15, in which the agent may be the home telecom service provider that manages the home network 21 and/or the roaming telecom service provider that manages the visiting network 26.

Figure 5:
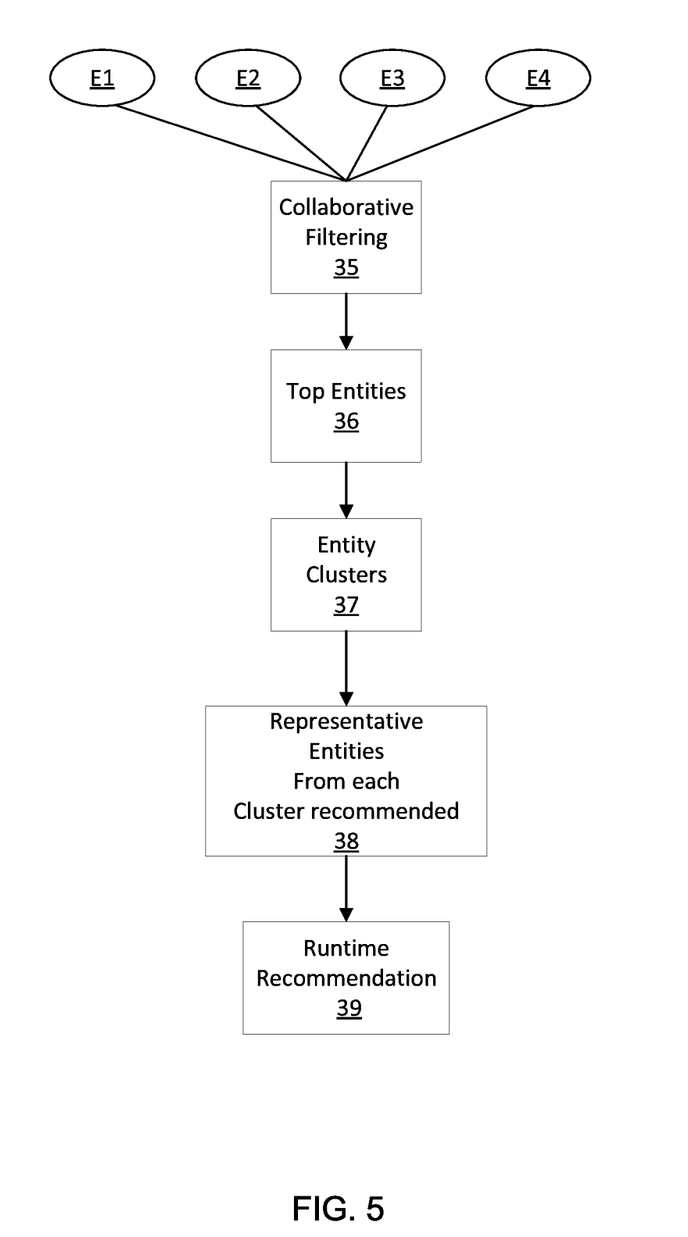
FIG. 5 illustrates one embodiment of a block diagram for a collaborative filtering system for matching preferences of the telecom user to the promotional offers of the vendors.

In some embodiments, matching the promotional offers 10a, 10b from vendors 22, 27 to the telecom users 15 based on the user preferences may include a collaborative filtering 35 approach as depicted in FIG. 5. The input to the collaborative filter 35 can be the entities E1, E2, E3, E4, (vendors 22, 26) having tags characterizing the promotional offers, the user profiles of the telecom users 15 having tagged preferences for receiving promotional offers, and the location of the telecom users. Top entities are provided at block 36. The collaborative filter can cluster the entities based on their meta-data at block 37. At block 38, a collaborative filtering algorithm can be run for the customer and entities to identify top entities to be recommended. In some embodiments, based on the nature of travel, filtering is applied to this recommendation, e.g., based on distance from user location, expected wait time, etc. At block 39, the runtime recommendations is provided.

In some embodiments, the collaborative filter process identifies entities from the top entities to provide a good representation from each cluster and recommend them to the user. The collaborative filter process can also capture the consent of the user on the ledger. If any message needs to be sent to the user regarding promotional offers, a scrubbing process can be run on the ledger to deliver the messages. Capture all the inputs, algorithm parameters, outputs on the blockchain ledger. New entities (roaming users) and customers subscribing to the service can get complete provenance of the recommendation by querying the ledger.

Referring back to FIG. 2, once the system 200 matches promotional offers to user preferences when the telecom user 15 is present in an area that corresponds to the promotional offers, the promotional offers may then be sent to the telecom device 14 of the telecom user at block 7. The message sent from the system 200 to the telecom device 14 may be the output 250 of the system 200 for providing promotional offers. The output 250 may be sent in real time to the telecom device 14 as the telecom user 15 is entering new service areas, e.g., the home area 20 and the roaming area 25. Block of the method depicted in FIG. 2 may include displaying the matched promotional offers on the interface of the telecom device 14 for the user of the telecom service when the user is in the service are matching the location of the vendor offering the promotional service.

The system 200 that is depicted in FIG. 3 may also include memory devices 208 and at least one processor 209, e.g., hardware processor. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Figure 6:
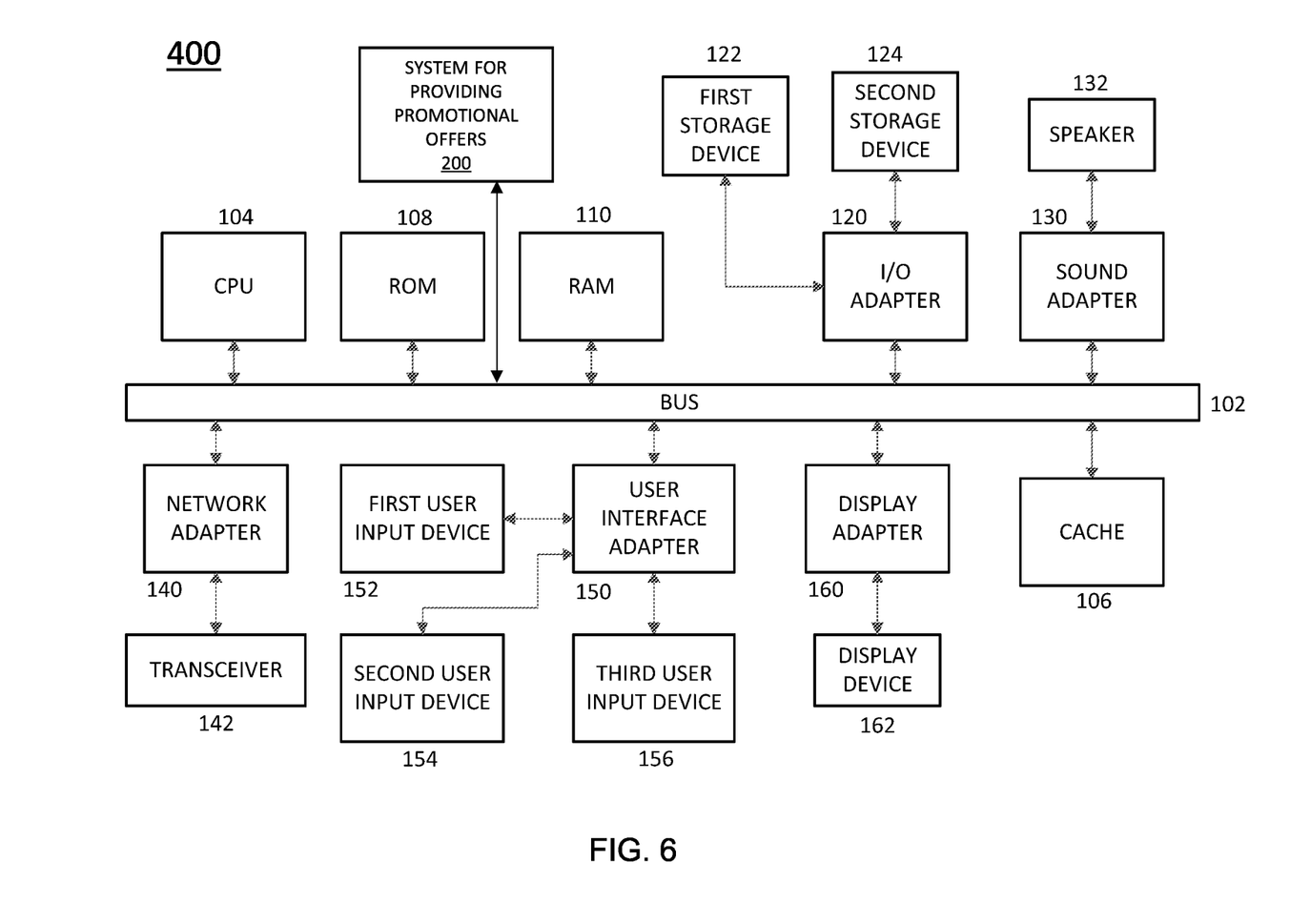
FIG. 6 is a block diagram illustrating a system that can incorporate the system for issuing promotional offers that is depicted in FIG. 3, in accordance with one embodiment of the present disclosure.

FIG. 6 is a block diagram illustrating a system that can incorporate the system 200 for issuing promotional offers that is depicted in FIG. 3. FIG. 6 depicts one embodiment of an exemplary processing system 400 to which the present invention may be applied is shown in accordance with one embodiment. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. In the embodiment that is depicted in FIG. 6, the system 200 for issuing promotional offers is also in communication with the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention. In some embodiments, the present disclosure can provide a computer program product is described for presenting regional based promotional offers. In one embodiment, the computer program product includes a computer readable storage medium having computer readable program code embodied therewith, the program instructions executable by a processor to cause the processor to record, using the processor, user preferences from a contract for telecom services. The computer readable program code can also tag, using the processor, telecom users of the telecom services with the user preferences. In some embodiments, the computer readable program code also receives, using the processor, promotional offers from vendors; and classifies, using the processor, the vendors as being in a home area or roaming areas for the telecom services. The computer readable program code can also include instructions to track, using the processor, the users through movement of a telecom device for the user that is receiving the telecom services to determine whether the user is in the home area or the roaming areas. In some instances, the computer readable program code may match, using the processor, the promotional offers from the vendors to the user preferences according to the tagging of the telecom users, wherein the promotional offers are from the home area of the home network or the roaming area of the roaming network; and send the matched promotional offers to the telecom users according to the tagging concurrently with the telecom users entering a home area or roaming area. The roaming matched promotional offers that are specific to the roaming area are sent to the telecom user when using the roaming network. The home matched promotional offers specific to the home area are sent to the telecom user when the user is using the home network.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for matching regional promotions to telecom user preferences using artificial intelligence (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for presenting regionally based promotional offers comprising:
   extracting data for user preferences from a contract for services, wherein extracting data comprises generating a blockchain ledger of user preferences for entity preference of vendors and category preference of vendors;
   tagging users of the services with the user preferences using the blockchain ledger of user preferences, wherein the tagging of users is configured in a hierarchical tree indicating services preferred by the users;
   receiving the promotional offers from the vendors;
   classifying the vendors as being in a home area of a home network including home antenna and home network interface or roaming areas of a roaming network including roaming network and roaming network interface for the service, the roaming network and the home network each being a SIM-based telecommunications network;
   tracking the users through movement of a cellular device by tracking cellular signal strength in the home network or roaming network for the user that is receiving the services to determine whether the user is in the home area or the roaming areas;
   matching the promotional offers from the vendors to the user preferences from the blockchain ledger using the hierarchical tree with a neural network analysis in a cloud computing environment according to the tagging of the users simultaneously with sensing a change in network presence of the users from between the home network and the roaming network, the blockchain ledger providing user consent to receive promotional offers in combination with the hierarchical tree and the neural network analysis to reduce user utility in the cloud computing environment, wherein the promotional offers are from the home area of the home network or the roaming area of the roaming network;
   sending matched promotional offers to the users according to the tagging concurrently with the users entering a home area or roaming area through the SIM-base telecommunications network, wherein roaming matched promotional offers specific to the roaming area are sent to the user when using the roaming network and home matched promotional offers specific to the home area are sent to the user when using the home network.

2. The computer-implemented method of claim 1, wherein the services are telecom services, the users are telecom users, and the device is a telecom device.

3. The computer-implemented method of claim 2, wherein the contract is a contract for the telecom services, and extracting data for user preferences comprises natural language processing for extracting the preferences from the contract for services.

4. The computer-implemented method of claim 2 further comprising displaying the matched promotional offers to the telecom users on a display of the telecom device for the telecom user concurrently with them entering one of the roaming area and the home area.

5. The computer-implemented method of claim 1, wherein the tagging of users of the services with the user preferences includes including preference content in the metadata of stored users in a database or distributed ledger.

6. The computer-implemented method of claim 1, wherein the receiving promotional offers from vendors is over an internet based network, short message service (SMS) via radio network or combinations thereof.

7. The computer-implemented method of claim 1, wherein the matching of the promotional offers from the vendors to the user preferences according to the tagging of the users comprises natural language processing to extract keywords from the offers, and matching the keywords of the offers for similarities in metadata of the tagging.

8. The computer-implemented method of claim 2, wherein the tracking of the telecom users through movement of the telecom device for the user that is receiving the telecom services to determine whether the user is in the home area or the roaming areas comprises a measurement of whether a cellular connection of the telecom device is to the home network or the roaming network.

9. A system for presenting regionally based promotional offers comprising:
a hardware processor; and
a memory that stores a computer program product, which, when executed by the hardware processor, causes the hardware processor to:
extract data for user preferences from a contract for services, wherein the extract of the data comprises generating a blockchain ledger of user preferences for entity preference of vendors and category preference of vendors;
tag users of the services with the user preferences using the blockchain ledger of user preferences, wherein the tagging of users is configured in a hierarchical tree indicating services preferred by the users;
receive promotional offers from the vendors;
classify the vendors as being in a home area of a home network including home antenna and home network interface or roaming areas of a roaming network including roaming network and roaming network interface for the services, the roaming network and the home network each being a SIM-based telecommunications network;
track the users through movement of a device for the user that is receiving the services by tracking cellular signal strength to determine whether the user is in the home area or the roaming areas;
match the promotional offers from the vendors to the user preferences from the blockchain ledger using the hierarchical tree with a neural network analysis in a cloud computing environment according to the tagging of the users simultaneously with sensing a change in network presence of the users from between the home network and the roaming network, the blockchain ledger providing user consent to receive promotional offers in combination with the hierarchical tree and the neural network analysis to reduce user utility in the cloud computing environment, wherein the promotional offers are from the home area of the home network or the roaming area of the roaming network; and
send matched promotional offers to the users according to the tagging concurrently with the users entering a home area or roaming area through the SIM-based telecommunications network, the wherein roaming matched promotional offers specific to the roaming area are sent to the user when using the roaming network and home matched promotional offers specific to the home area are sent to the user when using the home network.

10. The system of claim 9, wherein the services are telecom services, the users are telecom users, and the device is a telecom device.

11. The system of claim 10 further comprising displaying the matched promotional offers to the telecom users on a display of the telecom device for the telecom user concurrently with them entering one of the roaming area and the home area.

12. The system of claim 10, wherein the extract data for the user preferences comprises receiving a contract for telecom services and extracting preferences using natural language processing.

13. The system of claim 10, wherein the tagging of telecom users of the telecom services with the user preferences includes including preference content in the metadata of stored telecom users in a database or distributed ledger.

14. The system of claim 10, wherein the matching of the promotional offers from the vendors to the user preferences according to the tagging of the telecom users comprises natural language processing to extract keywords from the offers, and matching the keywords of the offers for similarities in metadata of the tagging.

15. A computer program product for presenting regionally based promotional offers comprising a computer readable storage medium having computer readable program code embodied therewith, the program instructions executable by a processor to cause the processor to:
extract, using the processor, data for user preferences from a contract for services, wherein the extract of the data comprises generating a blockchain ledger of user preferences for entity preference of vendors and category preference of vendors;
tag, using the processor, users of the services with the user preferences using the ledger of user preferences, wherein the tagging of users is configured in a hierarchical tree indicating services preferred by the users;
receive, using the processor, promotional offers from vendors;
classify, using the processor, the vendors as being in a home area or roaming areas for the services;
track, using the processor, the users through movement of a device for the user that is receiving the services to determine whether the user is in the home area of a home network including home antenna and home network interface or the roaming areas of a roaming network including roaming network and roaming network interface, the roaming network and the home network each being a SIM-based telecommunications network, wherein to track is tracking the users through movement of a device for the user that is receiving the services by tracking cellular signal strength;
match, using the processor, the promotional offers from the vendors to the user preferences from the blockchain ledger using the hierarchical tree with a neural network analysis in a cloud computing environment according to the tagging of the users simultaneously with sensing a change in network presence of the users from between the home network and the roaming network, the blockchain ledger providing user consent to receive promotional offers in combination with the hierarchical tree and the neural network analysis to reduce user utility in the cloud computing environment, wherein the promotional offers are from the home area of the home network or the roaming area of the roaming network; and
send, using the processor, matched promotional offers to the users according to the tagging concurrently with the users entering a home area or roaming area through the SIM-based telecommunications network, wherein roaming matched promotional offers specific to the roaming area are sent to the user when using the roaming network and home matched promotional offers specific to the home area are sent to the user when using the home network.

16. The computer program product of claim 15, wherein the services are telecom services, the users are telecom users, and the device is a telecom device.

17. The computer program product of claim 16 further comprising displaying, using the processor, the matched promotional offers to the telecom users on a display of the telecom device for the telecom user concurrently with them entering one of the roaming area and the home area.

18. The computer program product of claim 16, further comprising recording of the user preferences comprises receiving the contract for telecom services and extracting preferences using natural language processing.

19. The computer program product of claim 16, wherein the tagging of telecom users of the telecom services with the user preferences includes including preference content in metadata of stored telecom users in a database.

20. The computer program product of claim 16, wherein the matching of the promotional offers from the vendors to the user preferences according to the tagging of the telecom users comprises natural language processing to extract keywords from the offers, and matching the keywords of the offers for similarities in metadata of the tagging.

* * * * *